Jan. 25, 1927.                                                        1,615,712
W. A. LOTH
SYSTEM OF NAVIGATION AND PLANT FOR CARRYING IT OUT
Filed Feb. 27, 1925                          4 Sheets-Sheet 1
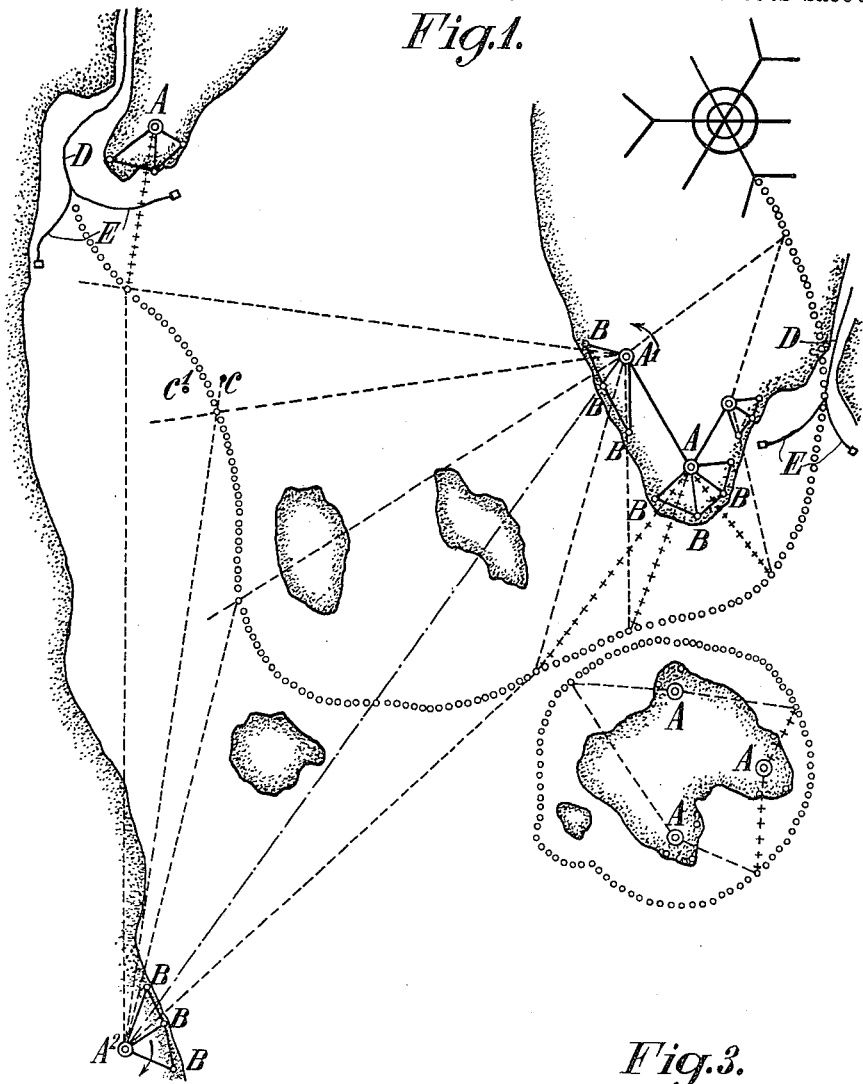
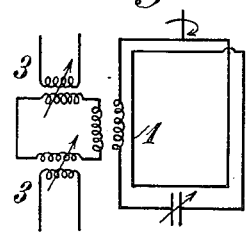
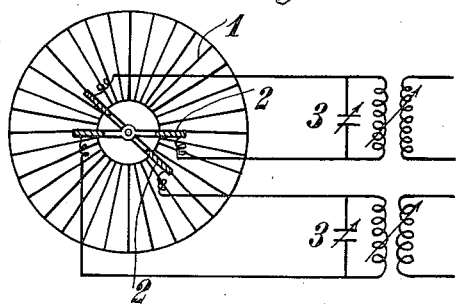

Jan. 25, 1927. 1,615,712
W. A. LOTH
SYSTEM OF NAVIGATION AND PLANT FOR CARRYING IT OUT
Filed Feb. 27, 1925 4 Sheets-Sheet 2
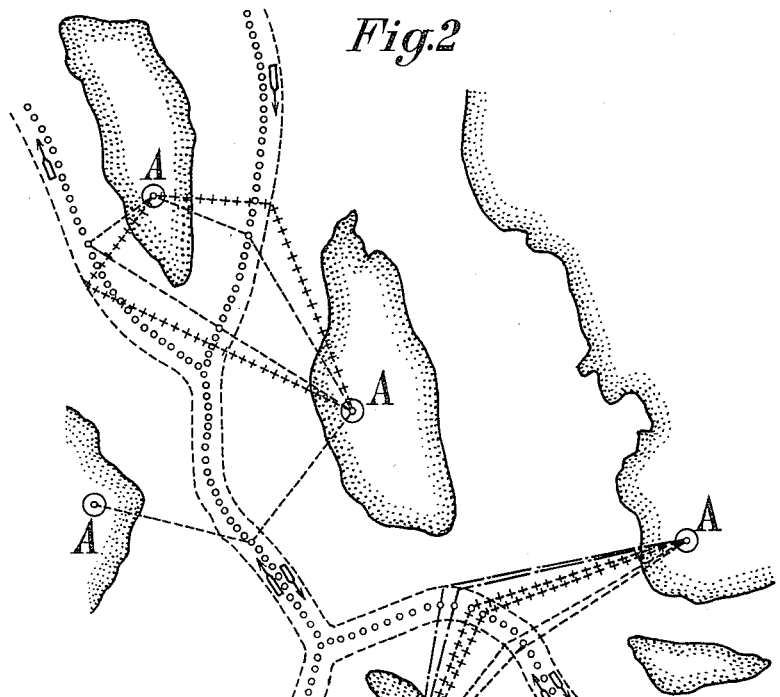
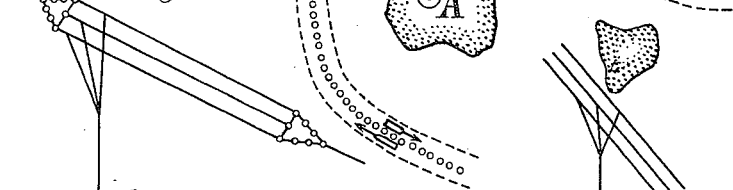
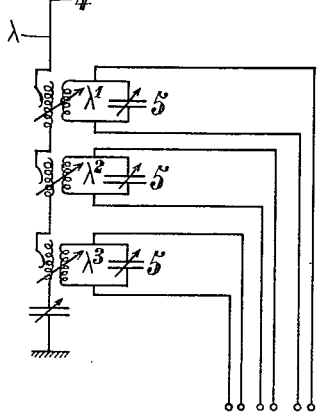
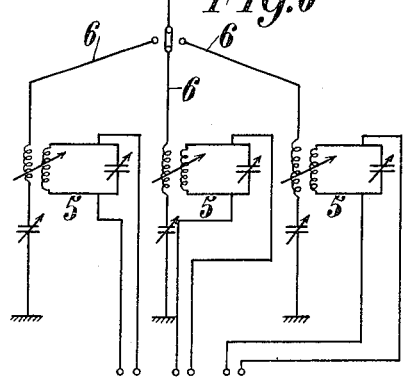
Inventor
W. A. Loth
By Marks & Clerk
Attys.

Jan. 25, 1927. 1,615,712
W. A. LOTH
SYSTEM OF NAVIGATION AND PLANT FOR CARRYING IT OUT
Filed Feb. 27, 1925 4 Sheets-Sheet 3

Jan. 25, 1927.  
W. A. LOTH  
1,615,712  
SYSTEM OF NAVIGATION AND PLANT FOR CARRYING IT OUT  
Filed Feb. 27, 1925  4 Sheets—Sheet 4

Patented Jan. 25, 1927.

1,615,712

UNITED STATES PATENT OFFICE.

WILLIAM ARTHUR LOTH, OF PARIS, FRANCE, ASSIGNOR TO SOCIÉTÉ INDUSTRIELLE DES PROCEDES W. A. LOTH, OF PARIS, FRANCE, A FRENCH COMPANY.

SYSTEM OF NAVIGATION AND PLANT FOR CARRYING IT OUT.

Application filed February 27, 1925, Serial No. 12,144, and in France March 7, 1924.

The present invention has for object a system of navigation which is essentially characterized in that the points defining the route to be followed are situated in position by the simultaneous reception, on board movable objects, either of the maxima or of the minima of rotating or oscillating directed emissions, or of rotating or oscillating directed or orientated emissions or of extinctions of emissions; these rotating or oscilating directed emissions being produced by emitting stations, located at fixed points relatively to the said route, stations the different successive orientations of emission of which depend on each other in the time. On board the movable objects to be guided, the variable characteristics of each of the said tracing emissions permit of determining the position of each movable object (ship, submarine or aircraft) along the route to be followed, the qualitative order of succession in the reception of the said emissions, or extinctions of emissions, permits of locating the side of the road to be followed on which is placed each movable object and the measurement of the time separating the receptions of the said emissions (maxima or extinctions) permits of evaluating the lateral distance separating any movable object from the route to be followed. At the base of the system there is therefore the repeated tracing of the route to be followed by the crossing point of movable emissions, united together and directed.

Instead of maxima and minama of reception, of two or more rotating or oscillating directed emissions, use can be made of rotatting directed emissions taking place only in a single direction or of rotating directed emissions taking place in all directions, except one.

In the course of the demonstration, the words "maximum and minimum" of emission will be employed for remaining in the most general case.

In the accompanying drawings and by way of example:

Figs. 1 and 2 are diagrammatic illustrations showing how the system of navigation allows of tracing the routes which are to be followed by the movable objects.

Figs. 3 and 4 show two forms of construction of an emitting tracing station.

Figs. 5 and 6 illustrate receiving stations.

Figure 7:
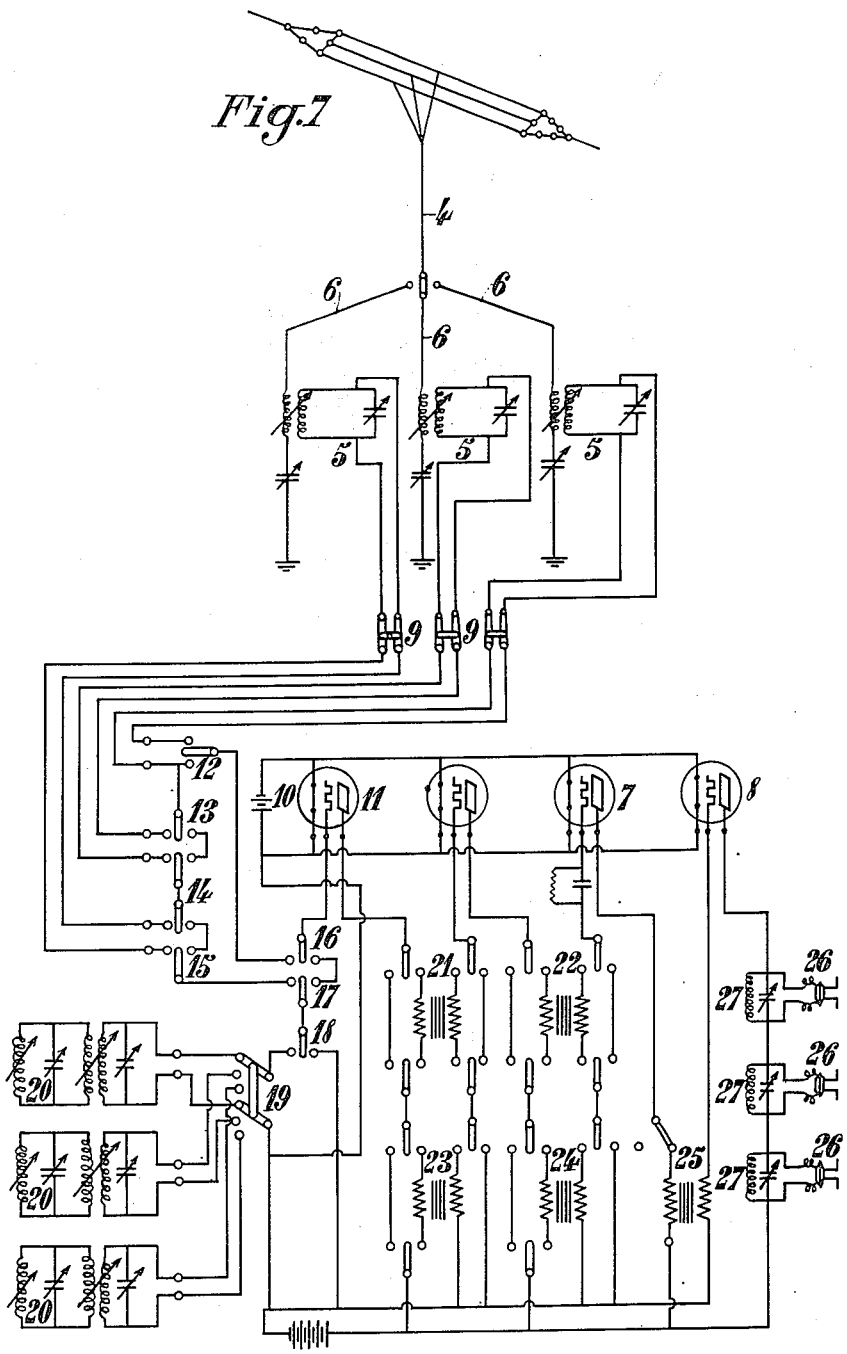
Figs. 7 and 8 are complete diagrams of the arrangement of receiving stations on board a movable object.

In the description given hereafter, by the term "emissions" is meant the production of luminous, electromagnetic directed waves, aerial or liquid waves with sonorous infra, or ultra-sonorous periods.

As above characterized, the system of navigation forming the subject-matter of the present invention, consists in determining the route to be followed by the movable object by the non-displaced reception (therefore, simultaneous for instance), on board the said movable object, of the maxima or minima of the directed emissions emitted, according to predetermined laws of displacement, by emitting stations A occupying fixed positions relatively to this route. In other words, the successive points of the route traced for the movable objects are the points of intersection of vectors, of variable lengths, issued from the emitting stations A, the lengths of these vectors (which correspond to different times of emission) as well as their directions and their angular displacements being so determined that, as previously indicated, their successive points of intersection trace the route.

It results therefrom that the displacements of the said vectors (that is to say the directions of emission of the stations) must be connected according to determined laws, which characterize the position of the route to be followed relatively to the points of emission.

By way of example, it will be seen that in order that the directions of the maxima or minima of the directed emissions produced by the stations A cross each other on the route and by determining the various points, it is necessary that the radii vectors vary, as well as their successive angles; this necessitates variable displacements connected by determined relations in variable times for the direction or directions of emission of each of these stations.

It is obvious that the route can be traced by stations located on the same side, or on either side of the said route and that the emissions of more than two stations can be used for determining, by their simultaneous reception on the movable object, the position of the latter on the route.

It results from the foregoing, that the emitting stations A must be connected together, by electric lines (aerial or buried lines, submarines cables, etc.) or by emissions of electromagnetic waves or of liquid waves, etc., so that the angular displacements of their emissions and the moments of these emissions give satisfaction to the conditions indicated. The displacements of the emission at a station or stations can also be controlled by the displacements of the emissions of a combined station, or the emissions of the various stations can be controlled by a central operating station.

In any way, the emissions of two or more stations of a tracing system are not, at any moment, independent, but are under control and must have, at any instant, a common time: This common time is obtained by the connections previously considered between the emitting stations. The connection can be continuous or discontinuous and can take place at distant intervals. The common time is then kept, at each station, by a pendulum or by a chronograph.

Moreover, for the purpose of determining at any moment the regulation of the moments and of the times of emission of the stations A, it is possible to combine with each emitter, receiving stations B, arranged at a certain distance from the stations A but connected to the latter by any suitable connection. These control stations B permit of taking up the irregularities of the emission, and, consequently, of determining the regulation at the emitting station A. It suffices, in fact, that the stations B should be aware at what moment they must receive the maximum or minimum emission from the station A they control for permitting them to signal to the latter, the displacements of its emission in the time at any instant.

If, moreover, the emissions are characterized, that is to say if they possess either wave lengths or rhythms or modulations, or special notes, it will be seen that the emitting stations A can produce several different emissions, subjected to different displacements, so that the emitting stations A can trace different routes, in the conditions indicated above (Fig. 2). These routes can be completely different from the first route considered and their points are determined by the simultaneous reception, on board the movable objects, of emissions having determined characteristics, permitting to differentiate them from other emissions. These routes can also be parallel to the first route so as to create about them two distinct zones of navigation. The differentiation of these zones will be explained hereafter;

For navigating on a route thus traced, it is necessary to know, at every instant:

1°—The position of the movable object relatively to the route, that is to say the side of the route on which the movable object is placed.

2°—The distance separating the movable object from the route.

3°—The distance where the movable object is located on the route, from the starting point or the point of arrival, which amounts, in other words, to compute the length of the said route in miles.

By way of example, the demonstration will be based on the carrying out of the system of navigation by using the electromagnetic waves and an utilization of the various characteristics of the tracing emissions will be given for entirely solving the problem.

1°—Side of the route.

It suffices, for obtaining this result, that the emissions the simultaneous reception of which must determine each point of the route, may be differentiated from each other (either by their wave lengths, their rhythms, their modulations, etc.). In these conditions, if the movable object is not exactly placed on the route, it will receive the maximum or the minimum of the emission from one of the stations A before the maximum or minimum of the emission from the other station, that is to say there will be no longer simultaneity in the reception of the minima on board the movable object.

By way of example, it will be supposed, for instance, that the station $A^2$ emits on a deep or low note, whilst the station $A^1$ emits on a sharp note. If the movable object, instead of being on the route, is at point C, that is to say on the right of the route, it will perceive (guiding by cessation of emission) the extinction of the sharp note before that of the deep or low note for the direction of rotation of the emission indicated by the arrows. If, on the contrary, the movable object is at $C^1$ on the left of the route, it will perceive, reversely, the extinction of the deep or low note before that of the sharp or high note.

It can therefore in any case locate itself relatively to the route. This is no longer true if the route crosses the straight line connecting the two emitting stations $A^1$ $A^2$ for instance. This inconvenience can be obviated by specially signalling the crossing point of this straight line with the route, but it is preferable to alter the characteristics of the emissions according as their directions of minima emission are arranged on one side or the other of the straight line connecting the stations. For instance, beyond this line, the station $A^2$ will give an emission on a sharp or high note, whilst the other station A¹ will emit on a deep or low note. The conditions of determination of the side of the route, on board the movable object, will then remain unaltered all along the said route.

2°—Knowledge of the distance separating the movable object from the nearest point of the route.

The movable object being outside the route, does not simultaneously receive the minima of the tracing emissions of different characteristics. It can therefore determine, on the one hand, what is the first emission received (this indicating the side of the route), on the other hand, the time separating the receptions from the two extinctions of the two emissions. This time for the region and the side where is located the movable object, is function of its distance from the route to be followed, measured at the nearest point, but varies in a continuous manner from a region of the route to the following region, for the same distance from the movable object to the route followed and for one and the same side of the route.

If the distance travelled over is known, that is to say at what kilometer the movable object is situated, it is possible to exactly determine the distance separating the movable object from the route.

This determination can even be effected without this latter knowledge. For that purpose, it suffices to give to the emissions such speeds of displacement that for one and the same side of the route, the values of the displacements between the receptions of the said emissions or of their extinctions correspond to determined distances (for instance 1 second or 5 seconds of displacement will correspond to 10 kilometers of distance from the movable object to the route for one and the same side).

3°—Division of the route in kilometers.

The route can be divided in kilometers by dividing it in equal parts or in unequal parts which correspond, in the latter case, to equal angles of displacement of the emissions.

For differentiating these sections or lengths of route, which can be equal or different, the wave lengths, rhythms, modulations or notes can be caused to vary per length of route or per section.

By way of example, if various routes are differentiated from each other by the wave lengths of the emissions and the emitting stations by their wave lengths and by their notes, it will be possible to differentiate the lengths or sections of the route by different rhythms which will be altered according to the section of the route swept by the emission.

The movable object can therefore locate itself on its route.

If the route is too long or if it is too complicated for permitting two emitting stations to determine it, it will be possible to use other stations combined together so as to pursue the said route. The successive groups are, preferably, so established that their indications overlap.

To sum up, the route will be obtained by the simultaneous reception of two extinctions of emissions, of different wave lengths and notes, received, for instance, by sound with receivers placed on each of the ears of the pilot; the side of the route will be obtained by the direction of the displacement between the receptions of the successive extinctions of the said emissions, the distance to the route by the quantitative values of the said displacement and the distance in kilometers by differentiation of the characteristics of the emissions, according to the section occupied by the movable object on the route. The location of the movable object can also be verified by counting, for each tracing emission, the time which elapses between its beginning and its maximum of intensity or, in a better manner, its minimum of intensity or extinction.

The means described above permit of creating a line of protection off a coast, around an island, a reef, etc. (lower part of Fig. 1).

The route traced can lead to immersed, buried or aerial cables D in which is sent a variable electric current which generates about the said cables a magnetic guide field; the route traced can even follow the cable so that the movable objects can guide themselves on the one hand on the magnetic field, on the other hand, owing to the points obtained by means of the simultaneous reception of the emissions produced by the emitting tracing stations. The guide cables D can, at their ends, form a fork E which surrounds the route to be followed.

It will be noted that the system described permits, at will, of modifying the laying out of a route, since it suffices to vary accordingly the laws of emission of the stations A.

Thus, for instance, if an obstacle is signalled on a route, it is possible to turn the latter aside and to conduct the movable objects, without the same knowing it, outside the dangerous zone.

If we suppose that the routes must be followed in a determined direction by the movable objects (that is to say, for instance, in the case of a single route) and that the movable objects going from a point to another must always keep to the left of the route, it will be seen that any collision is thus avoided, even by foggy weather. Concerning route crossings, they can be signalled, particularly by modification of the wave lengths, notes, modulations, rhythms of the emissions made by the stations. Moreover, the movable objects can be provided with plants permitting them to communicate together and to mutually signal their presence to each other, as is done by motor cars on land roads.

It is obvious that one of the emitting stations A and one only, might have a uniform speed of displacement and, in this case, it would be sufficient to regulate the displacements of the stations with which it combines, so as to obtain, as indicated, by simultaneity of the receptions of the emissions, the points of the route to be followed.

By way of example, a few means will be described hereafter permitting the realization of the system forming the subject-matter of the invention. This realization can obviously be used in telemechanics.

Emission.—

The stations emitting electromagnetic waves can be constituted by a rotating frame 1 (Fig. 4) moved by any mechanical means and the winding of which periodically comes in front of the corresponding winding of an emitter having several frequencies. The ends of the winding at the frame can lead to brushes rubbing on suitably arranged contact pieces for producing, at predetermined moments, one or more different emissions in the rotating system. The brushes can be placed in the primary circuit. Use can also be made of fixed frames relatively to which rotates a frame constructed as above mentioned. These means are known. A system of fixed armature (Fig. 3) can also be employed, the various turns 1 of this armature radiating about a vertical axis. This armature is movable about its axis. On these turns 1 can move one or more pairs of brushes 2 which are actuated by suitable mechanisms and insulated from each other. Each pair 2 is connected to a circuit 3 creating an emission of predetermined wave length, these wave lengths being different for the various circuits. It is thus possible to produce either simultaneously, or successively emissions directed in various manners and differentiating moreover from each other by the wave lengths, as previously indicated.

The emitting circuit proper 4 can be aperiodic (Fig. 5) and connected by a transformer to tuned circuits 5. This emitting circuit can also have a wave length which does not interfere with the emissions of different lengths and harmonic with its own, made simultaneously. Finally, if instead of simultaneous emissions of different wave lengths in one and the same frame or armature, one effects successive emissions of different wave lengths, at so rapid intervals that, at the reception, one has the impression of the continuity of reception, this emitter can be successively tuned on each different emission. The tracing emissions are continuous or realized by rapid successive tops. These tops can be sent in the proportion of one only or of an infinity per revolution of the emission. Instead of rendering the emission movable by mobility of a portion of the emitter, use may be made of rotating fields, the frames or armatures being then fixed. If very short waves (of the order of the meter) are employed, they can be concentrated in a predetermined and rotating direction, by a reflector-mirror and the route can be traced as previously indicated.

The intensities of the emissions can be adjustable, so as to keep the same ranges in the day and at night.

Reception.—

As many receiving antennæ can be used as there are distinct emissions to be received. The antenna 4 can be connected to as many branch lines 6 (Fig. 6) corresponding to the various tuned circuits 5 on the emissions to be received. In this latter case, each branch line comprises a variable capacity and self-induction coil for tuning the whole: antenna and branch line, on the wave length to be received. The branch lines might be either connected in a continuous manner, or successively and very rapidly connected to the common antenna 4 by a rotating switch or by any known system. Instead of using a common aperiodic antenna, the common antenna can be given a wave length favourable for the receptions of different wave lengths of the tracing emissions, which latter are suitably chosen in the harmonic scale of the first one.

The diagram (Fig. 7) shows the whole of the receiving plant when use is made of a receiving antenna 4 common to three branch lines 6, or when three different receiving antennæ are used, each having its tuned amplifier and a single telephonic receiver. In this case, the high frequencies received are amplified for detecting on the third lamp 7 of the amplifier for instance, then the low frequencies are amplified on the fourth lamp 8. But, obviously, it could also be possible to receive and detect in high frequency for subsequently amplifying in low frequency.

The system permits also the low frequency receptions of the magnetic guide fields created by the passage of a variable current in the guide cable, such as D.

In this diagram, the switches 9 permit of connecting the tuned branch lines 6 and the antenna 4, or the separated and tuned antennæ, to the amplifier having two high frequency stages (lamps 10, 11), a detecting lamp 7 and a low frequency amplifying lamp 8.

The switches 12, 13, 14, 15, permit of receiving, successively or simultaneously, either on the three branch lines 6, or on the three antennæ, two of which are used for the navigation and the third one for the telegraphic communications for instance. The switches 16, 17, 18, 19, permit of receiving the low-frequency, on the tuned windings 20 which can in their turn receive on the same wave length or on different wave lengths. If the wave lengths of low frequency are different, the switch 19 is unnecessary.

If reception is effected in high frequency, use is made for each lamp of the transformers H. F. 21—22 and of the low frequency transformer 25. The currents induced by the high frequency can be received in any form of known circuit, for instance in a reaction circuit generating or ready to generate waves of the same frequency as those received.

If reception is effected in low frequency, use is made of the transformers L. F. 23, 24, 25. All these switches for greater clearness, are diagrammatically illustrated, but they can be operated at the same time, by a suitable connection. On the plate circuit, of the fourth lamp 8 are mounted the telephonic receivers 26 branched to the terminals of the circuits 27, tuned on the different notes of the emissions, for instance.

These circuits are successively tuned on the low and high frequency receivers having different notes. In high frequency, for the navigation, these tuned circuits serve for receiving a tracing emission on an ear (high note) and the other emission on the other ear (low note). The telephones can also be tuned and are selecting telephones. It is thus possible to differentiate, by low frequency resonance after amplification in high and low frequency, high frequency emissions of equal or different wave lengths, but of different notes or modulations, amplified by the same amplifier. It is also possible to have in common the high frequency amplification portion for two tracing emissions of different wave lengths to which correspond two detecting lamps and two low frequency amplifying lamps, so that the station has 6 lamps instead of 8.

Figure 8:
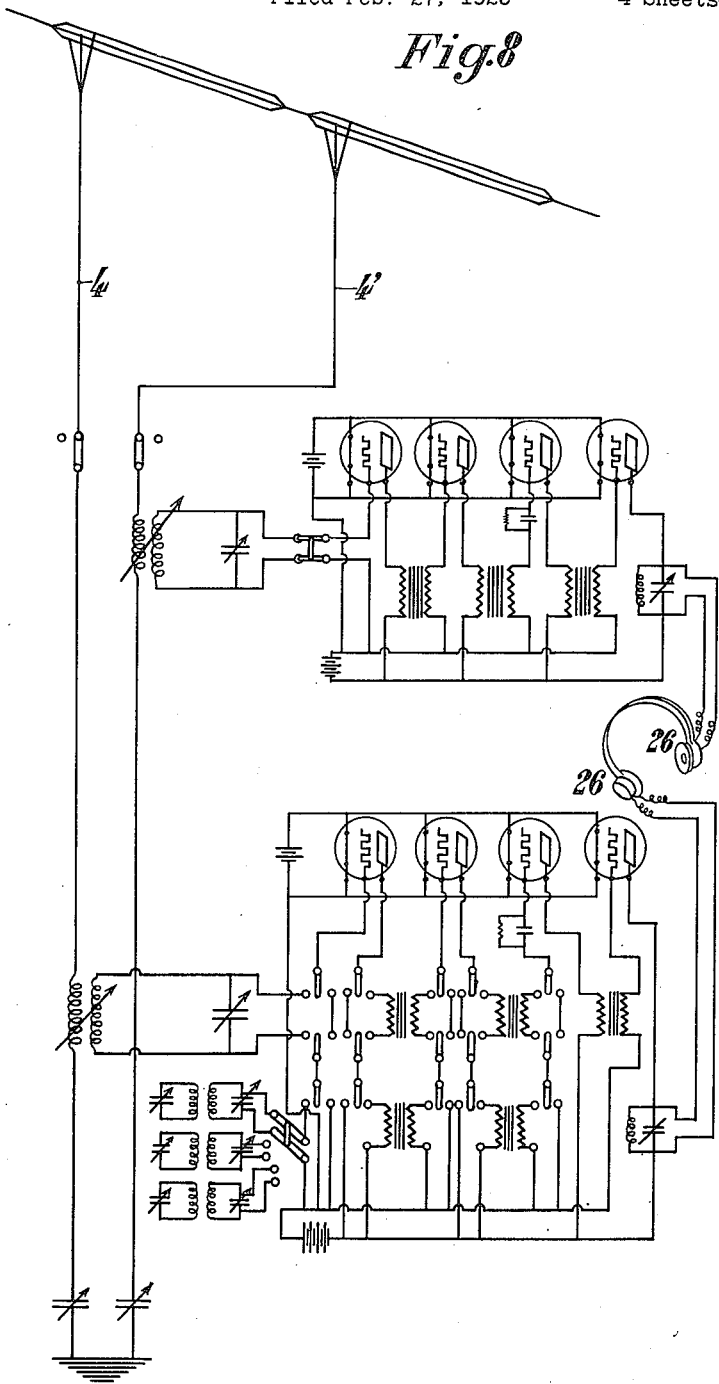

Fig. 8 shows a reception for physical navigation by means of two separate and independent antennæ 4, 4', each tuned on a particular wave length at one of the tracing stations of the route to be followed. Each tuned antenna is connected to a circuit in resonance and to a high and low frequency amplifier. On the leading out side of each transformer is arranged a telephonic listening device 26. One of the amplifiers (or both) can be used in low frequency for guiding purposes. These amplifiers can also have a receiving circuit with reaction in low frequency or in low and high frequency; instead of antennæ, windings (frames) can be used and, generally speaking, any receiver having no privileged direction of reception can be employed.

What I do claim as my invention and desire to secure by Letters Patent is:

1. A system of navigation comprising stations situated at fixed points and adapted to emit signals of definite characteristics, means for controlling said signals emitted by said stations whereby said signals may be simultaneously received along any predetermined path in space.

2. In the system defined in claim 1, means whereby the succession and interval of reception between the signals from the stations is proportional to the position of the receiving station relative to said path in space.

3. In the system defined in claim 1, means for controlling the emission of the signals from the stations to obtain a constant predetermined relationship between said signals.

4. A system of navigation comprising stations adapted to emit signals of different and definite characteristics, means for controlling said signals emitted by said stations whereby said signals may be simultaneously received along any predetermined path in space.

5. In a system of navigation, stations adapted to emit directional signals, means for rotating the direction vector of said signals, means for controlling the speed of rotation whereby the interval of reception between the maxima and minima of said station is dependent upon the position and distance of a receiving station from any predetermined path and space.

6. In the system defined in claim 1, means for controlling said signals whereby a receiving station located at different parts of the path receives a different signal from the same station than would be received at a different part of the path.

In testimony whereof I have signed my name to this specification.

WILLIAM ARTHUR LOTH.